Patented June 10, 1930

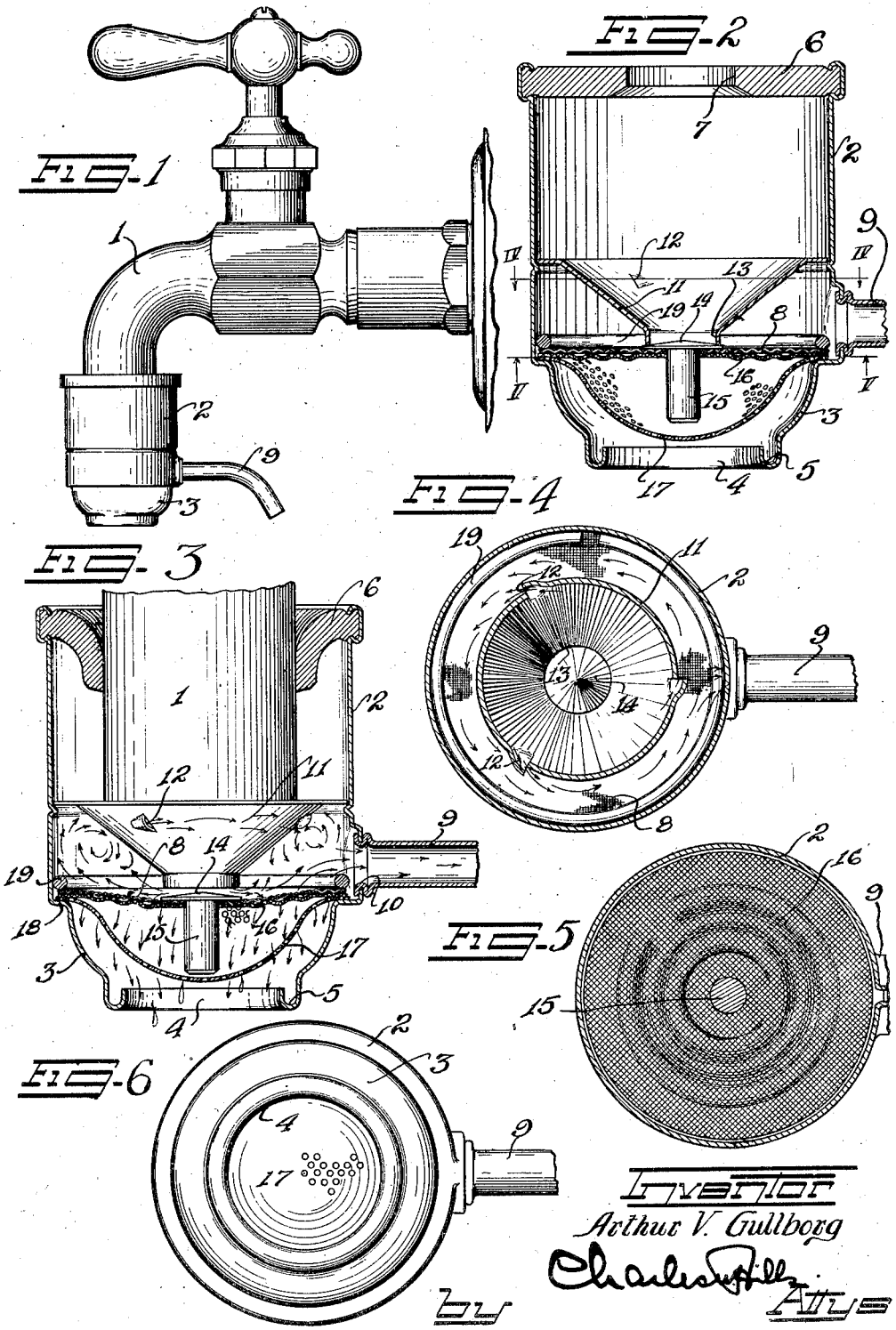

1,763,513

UNITED STATES PATENT OFFICE

ARTHUR V. GULLBORG, OF CHICAGO, ILLINOIS

FILTER

Application filed March 9, 1928. Serial No. 260,275.

This invention relates to improvements in filters and devices of like character, and more particularly to a filter for fluids, which is highly desirable for the substantial purification of water and similar liquids, although structures embodying the present invention may be used for many and varied purposes, including the filtration of certain gases, as will be apparent to one skilled in the art.

In the past, filtering devices have proven objectionable in most instances, in that foreign and undesirable substances were retained by the filtering means within the devices and accumulated on the filtering means, thereby causing the fluid to first pass through undesirable matter and then through the filter means, and tending to clog the filtering means so that only a reduced portion of the fluid could pass therethrough. This necessitated the employment of extraneous or additional means for cleaning the filtering means, and in many instances, necessitating the dismantling of the device to properly clean the filtering means, obviously resulting in undesirable and expensive delays. Especially were the above objections true in nearly every case with filtering devices mountable over a faucet or the like, for purifying the liquid flowing therefrom. These devices retained therein foreign matter filtered from the liquid, and in due course, actually drove undesirable quantities of the foreign matter through the filtering means by the frequently applied pressure thereon.

The present invention seeks to overcome the above noted defects and objections in the provision of a filtering device wherein the filtering means are effectively cleaned simultaneously with and by the fluid passing thereover.

The invention also seeks to provide a device of the class described herein in which the matter withheld by the filtering means is effectively and continuously discharged or ejected entirely from the device.

A further important object of the present invention is to provide a filtering device which is easily and quickly removably attached in a fluid-tight manner to a faucet or similar fluid supplying means.

A still further object of the present invention is to provide a filtering device wherein a fluid is applied to the filtering means in a swirling manner and so controlled that it will leave the filter in a smoothly flowing manner.

While some of the more salient features, characteristics, and advantages, of a device embodying this invention have been above pointed out, others will become apparent from the following disclosures.

The invention includes these and other features of construction and combinations of parts hereinafter described, and shown in preferred form in the drawings, as more particularly indicated by the claims.

On the drawings:

Figure 1 is a fragmentary view in elevation showing a faucet with a device embodying principles of the present invention attached thereto.

Figure 2 is a fragmentary substantially central vertical sectional view through the device itself.

Figure 3 is a fragmentary view similar to Figure 2 showing the device attached as in Figure 1 and indicating the operation of the device.

Figure 4 is a fragmentary plan sectional view taken substantially along line IV—IV of Figure 2.

Figure 5 is a fragmentary bottom plan sectional view taken substantially along line V—V of Figure 2.

Figure 6 is a fragmentary bottom plan view of the device.

As shown in the drawings:

In Figure 1 of the drawings there is shown a faucet 1 over the mouth of which the illustrated embodiment of the present invention is engaged in a manner to be hereafter described.

The illustrated embodiment of the present invention includes a casing 2 open at the top thereof, and bell-shaped as at 3, adjacent its bottom portion where it is provided with a somewhat restricted outlet orifice 4, preferably formed by folding the material of the casing inwardly to form a channel 5 therearound which aids in imparting a smooth flow to the fluid leaving the casing. The opening at the top of the casing 2 is partially closed by a resilient disk 6 secured in the casing in any desired manner or as shown by bending the casing walls therearound in order to grip the disk. The disk is provided with a central aperture 7 so that it may be forcibly slipped over the mouth of the faucet 1, as shown more clearly in Figure 3. When so position the disk will be downwardly bent and due to the inherent resiliency therein will tightly embrace the faucet to thereby support the casing 2 and provide a simple fluid-tight connection, the pressure of the fluid within the casing 2 on the disk aiding in making the connection fluid-tight.

Within the casing 2, a filtering screen 8 is provided which is of desirably fine mesh to adequately remove foreign substances from the fluid to be filtered. Just in advance of the screen 8, discharge means are provided for a portion of the fluid containing the foreign matter filtered out by the screen 8. The discharge means comprise, in this instance, an outlet conduit 9 which is secured adjacent an aperture in the casing wall, preferably by bending the conduit to form an annular groove therein, as indicated at 10, which grips the casing wall adjacent the aforesaid aperture to establish a fluid-tight connection. The outer end of the discharge conduit 9 is preferably downwardly inclined, as shown more clearly in Figure 1, so that the fluid discharged therethrough will not interfere in any manner with the reception of the fluid flowing from the casing orifice 4, and if the device is mounted over a sink or the like, the undesirable fluid will be discharged through the conduit 9 against the splash board of the sink in an easy manner, eliminating any undesirable splashing.

In the present instance, means are provided for directing the fluid to be filtered over and on the filtering screen 8 in such a manner that the screen will be continually cleared of the foreign matter held thereby, by the action of the fluid itself. The fluid directing means, in this instance, comprise a funnel-shaped member 11 having a plurality of transverse orifices 12 in the side thereof and a major discharge orifice or nozzles 13 at the bottom thereof. The mouth of the faucet 1 preferably extends within the funnel-shaped portion of the member 11 so that the fluid to be filtered will be discharged directly into this member.

The major orifice 13 in the member 11, is normally closed by means of a conically topped valve 14, the stem 15 of which projects downwardly through the screen 8 and a corrugated screen 16 disposed beneath the screen 8. The corrugated screen 16 is resilient in its nature and is so corrugated to aid in the retention of the inherent elasticity in the screen so that the same will not be forced beyond its elastic limit by the pressure of the fluid exerted upon the valve head 14, whereby the screen 16 will force the valve upwardly to close the orifice 13 whenever the fluid is shut off. It is to be especially noted that the resiliency of the corrugated screen 16 which directly controls the action of the valve 14, permits the orifice 13 to be opened by the movement of the valve an amount directly proportional to the pressure of the fluid to be filtered.

Disposed below the screen 16 is a splash preventing screen 17, preferably cup-like in structure and of sufficient depth to permit free action of the valve 14. The screens 8, 16, and 17, are supported, in the present instance, by an annular shoulder 18 formed in the casing wall, and are held down upon this shoulder by a spring ring 19.

The operation of the present invention is very simple though none the less efficient. The device is first attached as hereinbefore described to the mouth of the faucet 1. When fluid is permitted to pass through the faucet 1 it enters directly into the funnel-like member 11, the minor portion of the fluid passing through the transverse orifices 12 and the major portion exerting a pressure through the orifice 13 on the valve head 14. The valve will respond with a downward movement proportional to the pressure of the fluid, and the major portion of the fluid will be discharged over and on the filtering screen 8 striking the same at a relatively large obtuse angle thereto. Due to the transverse discharge of the fluid through the orifices 12 and the substantially transverse discharge of the fluid over the valve head, a swirling action is given to the fluid, as indicated by the arrows in Figure 3, which effectively clears the screen 8 of the foreign substances retained thereby. The swirling action continues in a degree sufficient to discharge a portion of the fluid together with the foreign substances filtered out of the fluid through the conduit 9, although the major portion of the fluid passes downwardly through the screens, 8, 16, and 17, and out the orifice 4. Obviously, the fluid passing through the orifice 4 will be cleaned and purified by the screens, the screen 17 imparting a smooth flow to this portion of the fluid.

Although the illustrated embodiment of the present invention is shown attached to a faucet, it is to be clearly understood that devices embodying principles of the present invention may be used in connection with any desired fluid supply means.

From the foregoing it is apparent that I have provided a filter in which the filtering means are continually cleared of foreign substances by the action of the fluid to be filtered, and which is easily attached to or detached from fluid supply means, simple in construction, and economically manufactured.

I am aware that many changes may be made and numerous details of construction may be varied through a wide range without departing from the principles of this invention and I, therefore, do not purpose limiting the patent granted hereon otherwise than necessitated by the prior art.

I claim as my invention:

1. In a device of the character described, foraminous means, major and minor means for directing a fluid over said foraminous means, and means normally blocking the action of said major directing means but proportionally responsive to the pressure of said fluid to permit said action.

2. In a device of the class described, filtering means, means having a major orifice and minor orifices therein for directing a fluid onto said filtering means, a valve normally closing said major orifice, and resilient means responsive to the pressure of said fluid for controlling said valve.

3. In a filter, a screen, means for directing a fluid on said screen, means tending to block the action of said fluid through said directing means, and means adjacent said screen for releasingly actuating said blocking means an amount proportional to the pressure of said fluid.

4. In a filter, a screen, means for directing a fluid onto said screen, a valve tending to block the action of said fluid through said directing means, and a corrugated screen disposed adjacent the outer side of said first mentioned screen for actuating said valve an amount proportional to the pressure exerted thereon by said fluid.

5. In a device of the class described, a casing having an outlet orifice therein, means for attaching said casing to fluid supply means, a screen in said casing, means having an orifice therein for directing fluid onto said screen, a valve normally closing said last mentioned orifice, a resilient screen adjacent said first mentioned screen for actuating said valve in proportion to the pressure of said fluid, and a splash preventing screen disposed in advance of said outlet orifice.

6. In a device of the character described, a casing, foraminous means therein, a hollow element in advance of said foraminous means for directing a fluid thereupon, said element having a major orifice therein and a plurality of minor transversely disposed nozzles, and means for diffusing the fluid from said major orifice substantially parallel to and over said foraminous means.

7. In a device of the character described, filtering means, means for directing a fluid through major and minor orifices upon said filtering means in such a manner that the same is continually cleared, means responsive to the pressure of said fluid for controlling the admission thereof through said major orifice, discharge means in advance of said filtering means for a portion of said fluid containing matter retarded by said filtering means, and means beyond said filtering means for imparting a smooth flow to the fluid passing therethrough.

In testimony whereof I have hereunto subscribed my name at Chicago, Cook County, Illinois.

ARTHUR V. GULLBORG.